(12) United States Patent
Jung et al.

(10) Patent No.: US 12,057,545 B2
(45) Date of Patent: *Aug. 6, 2024

(54) POUCH EXTERIOR MATERIAL FOR SECONDARY BATTERY, POUCH TYPE SECONDARY BATTERY USING THE SAME, AND METHOD OF MANUFACTURING THE SAME

(71) Applicant: LG ENERGY SOLUTION, LTD., Seoul (KR)

(72) Inventors: Tai-Jin Jung, Daejeon (KR); Byoung-Cheon Jeong, Daejeon (KR); Dal-Mo Kang, Daejeon (KR); Jeong-O Mun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 177 days.

This patent is subject to a terminal disclaimer.

(21) Appl. No.: 17/547,657

(22) Filed: Dec. 10, 2021

(65) Prior Publication Data

US 2022/0102790 A1 Mar. 31, 2022

Related U.S. Application Data

(63) Continuation of application No. 16/334,509, filed as application No. PCT/KR2018/007813 on Jul. 10, 2018, now Pat. No. 11,239,515.

(30) Foreign Application Priority Data

Jul. 20, 2017 (KR) .................. 10-2017-0092152
Jun. 29, 2018 (KR) .................. 10-2018-0075766

(51) Int. Cl.
*H01M 10/04* (2006.01)
*H01M 50/105* (2021.01)
(Continued)

(52) U.S. Cl.
CPC ..... *H01M 10/0436* (2013.01); *H01M 50/105* (2021.01); *H01M 50/119* (2021.01);
(Continued)

(58) Field of Classification Search
CPC .................................................. H01M 50/105
See application file for complete search history.

(56) References Cited

U.S. PATENT DOCUMENTS 6,743,546 B1 * 6/2004 Kaneda ............. H01M 10/0486
429/129
9,701,449 B2 * 7/2017 Jacobus ................. B65D 43/12
(Continued)

FOREIGN PATENT DOCUMENTS

CN 205050882 U 2/2016
JP 2001-338695 A 12/2001
(Continued)

OTHER PUBLICATIONS

Extended European Search Report, dated Mar. 12, 2020, for European Application No. 18834580.5.
(Continued)

*Primary Examiner* — Sadie White
(74) *Attorney, Agent, or Firm* — Birch, Stewart, Kolasch & Birch, LLP

(57) ABSTRACT

A pouch exterior material that enables an electrode assembly to be easily mounted on an accommodating portion at a proper position, having an integrated shape and including an inserting portion provided at a center of the pouch exterior material and having a width equal to a thickness of the electrode assembly, accommodating portions provided symmetrically at two sides of the inserting portion and gradually deepening from a portion corresponding to a width center of the electrode assembly towards a portion corresponding to an edge of the electrode assembly, and a triangular stepped
(Continued)

portion provided at two ends of the inserting portion and having a depth gradually decreasing towards an end.

12 Claims, 13 Drawing Sheets

(51) Int. Cl.
    *H01M 50/119* (2021.01)
    *H01M 50/121* (2021.01)
    *H01M 50/124* (2021.01)
    *H01M 50/178* (2021.01)
    *H01M 50/548* (2021.01)
    *H01M 50/557* (2021.01)
    *H01M 50/609* (2021.01)

(52) U.S. Cl.
    CPC ....... *H01M 50/121* (2021.01); *H01M 50/124* (2021.01); *H01M 50/178* (2021.01); *H01M 50/548* (2021.01); *H01M 50/557* (2021.01); *H01M 50/609* (2021.01); *H01M 2220/20* (2013.01)

(56) References Cited

U.S. PATENT DOCUMENTS

| | | | |
|---|---|---|---|
| 2009/0311592 A1* | 12/2009 | You | H01M 10/0436 429/162 |
| 2010/0003594 A1 | 1/2010 | Hong et al. | |
| 2013/0011721 A1 | 1/2013 | Kim et al. | |
| 2013/0101894 A1* | 4/2013 | Baba | H01M 50/105 493/162 |
| 2014/0255757 A1* | 9/2014 | Kang | H01M 50/103 429/149 |
| 2015/0214512 A1 | 7/2015 | Kim | |
| 2015/0303414 A1 | 10/2015 | Park et al. | |
| 2016/0043355 A1* | 2/2016 | Byun | H01M 50/105 29/623.2 |
| 2018/0219245 A1 | 8/2018 | Choi et al. | |

FOREIGN PATENT DOCUMENTS

| | | |
|---|---|---|
| JP | 2004-71301 A | 3/2004 |
| JP | 2004-165134 A | 6/2004 |
| JP | 2013-206691 A | 10/2013 |
| KR | 10-0895202 B1 | 5/2009 |
| KR | 10-2010-0003557 A | 1/2010 |
| KR | 10-1253671 B1 | 4/2013 |
| KR | 10-1357319 B1 | 2/2014 |
| KR | 10-2014-0115846 A | 10/2014 |
| KR | 10-2016-0019314 A | 2/2016 |
| KR | 10-2016-0077871 A | 7/2016 |
| KR | 10-2017-0052061 A | 5/2017 |

OTHER PUBLICATIONS

International Search Report for PCT/KR2018/007813 mailed on Oct. 23, 2018.

* cited by examiner (a)　　　　　　　　　　(b)

POUCH EXTERIOR MATERIAL FOR SECONDARY BATTERY, POUCH TYPE SECONDARY BATTERY USING THE SAME, AND METHOD OF MANUFACTURING THE SAME

CROSS-REFERENCE TO RELATED APPLICATIONS

This application is a Continuation of application Ser. No. 16/334,509, filed on Mar. 19, 2019, which is the National Phase of PCT International Application No. PCT/KR2018/007813, filed on Jul. 10, 2018, which claims priority under 35 U.S.C. § 119 to Application No. 10-2018-0075766, on Jun. 29, 2018 and Application No. 10-2017-0092152, on Jul. 20, 2017, filed in the Republic of Korea, all of which are hereby expressly incorporated by reference into the present application.

TECHNICAL FIELD

The present disclosure relates to a pouch exterior material for a secondary battery, a pouch type secondary battery using the same, and a method of manufacturing the same, and more particularly, to a pouch exterior material for a secondary battery, in which a forming shape is improved such that energy density of a cell is improved, a pouch type secondary battery using the pouch exterior material, and a method of manufacturing the pouch type secondary battery. The present application claims priority to Korean Patent Application No. 10-2017-0092152 filed on Jul. 20, 2017 and Korean Patent Application No. 10-2018-0075766 filed on Jun. 29, 2018 in the Republic of Korea, the disclosures of which are incorporated herein by reference.

BACKGROUND ART

Secondary batteries are widely used as power sources of mobile devices, such as a mobile phone, a laptop computer, a camcorder, etc. In particular, the use of lithium secondary batteries is rapidly increasing due to a high operating voltage and high energy density per unit weight.

Such a lithium secondary battery mainly uses a lithium-based oxide as a positive electrode active material and a carbon material as a negative electrode active material, and generally, may be distinguished into a lithium ion battery, a lithium ion polymer battery, or a lithium polymer battery based on a type of an electrolyte being used or may be distinguished into a cylindrical type, a rectangular type, or pouch type secondary battery based on an outer shape of a battery. Typically, in terms of a shape of a battery, demands for the rectangular type secondary battery and the pouch type secondary battery, which are applicable to products, such as mobile phones, etc. with a thin thickness, are high.

Thereamong, the pouch type secondary battery that does not have restriction on a shape and size, is easily assembled via thermal fusion, and easily discharges a gas or liquid when an abnormal behavior occurs, and thus is specifically suitable for manufacturing a light-weight cell having a thin thickness is in the limelight. Generally, the pouch type secondary battery has a structure in which an electrode assembly is embodied in a pouch exterior material formed of an aluminum laminate sheet. In other words, the pouch type secondary battery is manufactured by forming an accommodating portion for mounting the electrode assembly on the aluminum laminate sheet and thermally fusing a separate aluminum laminate sheet separated from the aluminum laminate sheet or the aluminum laminate sheet that is extended while the electrode assembly is provided in the accommodating portion.

In such a pouch exterior material, the accommodating portion may be formed by partially compressing the aluminum laminate sheet having a thickness of about 113 μm by using a die and a punch via a similar method as a deep-drawing process. However, the aluminum laminate sheet having such a thin thickness may break or the like during the compression, and thus it is generally difficult to form the accommodating portion having a depth equal to or greater than 15 mm.

Meanwhile, in a separable pouch exterior material, since two units of aluminum laminate sheet are combined by being overlapped and sealed, accommodating portions at two sides need to be overlapped at proper positions while an electrode assembly is embodied therein during processes of manufacturing a secondary battery. If the electrode assembly is not mounted to a proper position, an internal short circuit is generated, and thus a separate guiding device is required, thereby increasing manufacturing costs. Also, since the two units of aluminum laminate sheet are combined on four sides to form a sealing portion, the two units of aluminum laminate sheet are in contact with the atmosphere from all four sides, and thus the possibility of air inflow is extremely increased after the long-term use, thereby reducing a life of the battery.

In this regard, many techniques regarding a method of forming two corresponding accommodating portions on one unit of aluminum laminate sheet, overlapping the accommodating portions, and sealing three sides have been introduced.

FIG. 1 is a top view of a pouch exterior material 10 of a general 3-side sealing pouch type secondary battery. FIG. 2 is cross-sectional views of operations of a method of manufacturing a pouch type secondary battery using the pouch exterior material of FIG. 1, which are taken along a line of FIG. 1. FIG. 3 is a top view of a pouch type secondary battery manufactured via the method of FIG. 2.

First, referring to FIG. 1 and (a) of FIG. 2, two accommodating portions 20a and 20b, which have completely corresponding shapes and sizes, are formed on one unit of the pouch exterior material 10 such as to be spaced apart from each other by a certain distance d greater than a thickness of an electrode assembly 30.

Then, while the electrode assembly 30 is mounted on the accommodating portion 20a or 20b as shown in (b) of FIG. 2, a center portion F between the accommodating portions 20a and 20b is bent as shown in (c) of FIG. 2 to stack the accommodating portions 20a and 20b as shown in (d) of FIG. 2, and then remaining 3 sides excluding the bent side are sealed as indicated by a reference numeral S, thereby manufacturing the pouch type secondary battery as shown in FIG. 3.

Such a technology of manufacturing the pouch type secondary battery may reduce a depth t of the accommodating portions 20a and 20b formed in the pouch exterior material 10 by about half of a thickness of the electrode assembly 30, and one side (a side of the bent center portion F) among four sides of the pouch type secondary battery may maintain a sealed state.

However, while the pouch exterior material 10 is compressed to form the two adjacent accommodating portions 20a and 20b, the center portion F that is to be bent later is elongated in two sides such that the accommodating portions 20a and 20b are formed, and thus mechanical strength is weakened compared to when the center portion F is elongated in one side, and as a result, the center portion F is highly likely to break while the accommodating portions 20a and 20b are formed and/or bent. Thus, the accommodating portions 20a and 20b are spaced apart from each other by the certain distance d, and are formed to have a margin of about 1.5 mm to 3 mm around the center portion F that is bent during folding, considering a bent shape of a portion where the pouch exterior material 10 is folded.

The pouch type secondary battery has many demands from customers for high capacity and miniaturization, and various structures and processes are studied/developed to realize the demands of customers. In particular, there have been attempts to study a method of increasing battery capacity by using an unnecessary space so as to increase capacity in the pouch type secondary battery.

However, in the general 3-side sealing pouch type secondary battery described with reference to FIGS. 1 through 3, due to the margin of about 1.5 mm to 3 mm around the center portion F that is bent while the pouch exterior material 10 is folded, a folding portion W that is an unnecessary space is generated and protrudes. Such a folding portion W acts as a limitation of cell capacity, lowers energy density in a module/pack, and is disadvantageous in a cooling structure, and thus needs to be improved.

Meanwhile, pouch type secondary batteries that do not include the folding portion W are also suggested.

FIG. 4 is schematic views of an example of manufacturing another general pouch type secondary battery in an order of processes.

Referring to (a) of FIG. 4, first, a pouch exterior material 60 processed in necessary length and width is bent almost at a center portion C in a length direction to determine a position an electrode assembly 40 and arrange the electrode assembly 40. Here, a lead 50 extracted from electrodes forming the electrode assembly 40 is led to a front end of the pouch exterior material 60.

Then, in (b) of FIG. 4, other opened sides of the pouch exterior material 60 excluding a side where the lead 50 is led out are sealed as indicated by the reference numeral S. Next, a necessary electrolyte solution is injected through an opened portion where the lead 50 is led out, and then the opened portion is also sealed.

According to the example of (a) and (b) of FIG. 4, a folding portion is not formed. However, since the pouch exterior material 60 at the bent portion is pressed during the sealing, a protruding portion is generated in a direction of a bottom surface as indicated by a reference numeral A in (b) of FIG. 4, and thus compactification of the protruding portion is damaged. Like a folding portion described above, the protruding portion acts as a limitation of cell capacity, lowers energy density in a module/pack, and is arranged in a bur shape called a bat ear, and thus hinders module assembly.

As such, in one unit of pouch exterior material, the necessity for a pouch exterior material that does not have an unnecessary space so as to increase energy density of a cell while reducing a defective rate by preventing breakage or the like of the pouch exterior material during a process of forming an accommodating portion of an electrode assembly and/or a process of bending and overlapping the accommodating portion is increasing.

DISCLOSURE

Technical Problem

The present disclosure is designed to solve the problems of the related art, and therefore the present disclosure is directed to providing a pouch exterior material that enables an electrode assembly to be easily mounted on a proper position of an accommodating portion, has an integrated shape to increases a life characteristic of a battery by minimizing a sealing portion contacting the atmosphere, is prevented from breaking during assembly, and increases energy density of a cell by not including an unnecessary space such as a folding portion or a protruding portion.

The present disclosure is also directed to providing a pouch type secondary battery using the pouch exterior material and a method of manufacturing the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a sheet type pouch exterior material for packing an electrode assembly, the pouch exterior material including: an inserting portion provided at a center of the pouch exterior material and having a width equal to a thickness of the electrode assembly; accommodating portions provided symmetrically at both sides of the inserting portion and gradually deepening from a portion corresponding to a width center of the electrode assembly towards a portion corresponding to an edge of the electrode assembly; and a triangular stepped portion provided at opposite ends of the inserting portion and having a depth gradually decreasing towards an end.

A depth of a bottom corner of each of the accommodating portions furthest from the inserting portion may be equal to or greater than ½ of the thickness of the electrode assembly. The pouch exterior material between the inserting portion and each of the accommodating portions may be a flat section. Outer sides of the accommodating portions facing the inserting portion may be substantially elongated.

A pouch type secondary battery according to an embodiment is manufactured by accommodating the electrode assembly in the pouch exterior material and thermally fusing the pouch exterior material.

In particular, in another aspect of the present disclosure, there is also provided a pouch type secondary battery including: an electrode assembly; and a sheet type pouch exterior material packing the electrode assembly, wherein the pouch exterior material includes: an inserting portion provided at a center of the pouch exterior material and having a width equal to a thickness of the electrode assembly; accommodating portions provided symmetrically at two sides of the inserting portion and gradually deepening from a portion corresponding to a width center of the electrode assembly towards a portion corresponding to an edge of the electrode assembly; and a triangular stepped portion provided at two ends of the inserting portion and having a depth gradually decreasing towards an end.

In another aspect of the present disclosure, there is also provided a method of manufacturing a pouch type secondary battery, the method including: preparing a sheet type pouch exterior material for packing an electrode assembly, the pouch exterior material including: an inserting portion provided at a center of the pouch exterior material and having a width equal to a thickness of the electrode assembly; accommodating portions provided symmetrically at two sides of the inserting portion and gradually deepening from a portion corresponding to a width center of the electrode assembly towards a portion corresponding to an edge of the electrode assembly; and a triangular stepped portion provided at two ends of the inserting portion and having a depth gradually decreasing towards an end; mounting a side surface of the electrode assembly upright on the inserting portion and stacking the accommodating portions by folding up the pouch exterior material from both sides; and thermally fusing a surrounding region of the stacked accommodating portions.

Here, outer sides of the accommodating portions facing the inserting portion may be substantially elongated, regions of the accommodating portions excluding the outer sides may be thermally fused after the accommodating portions are stacked, the method further comprises injecting an electrolyte solution through the outer sides of the accommodating portions, thermally fusing the outer sides of the accommodating portions, and cutting off the outer sides of the accommodating portions.

Advantageous Effects

The present disclosure provides a pouch exterior material that can remove an unnecessary space of a folding portion from a 3-side sealing pouch type secondary battery and is formed such that a protruding portion is also not formed after sealing.

The pouch exterior material according to the present disclosure does not require a margin of about 1.5 mm to 3 mm considering folding around a center portion like a general pouch exterior material since the pouch exterior material is folded up from two sides while a side surface of an electrode assembly is mounted upright on an inserting portion instead of being folded at the center portion like a related art.

According to the present disclosure, since a region of the electrode assembly in the pouch exterior material is maximized without leaving an unnecessary space in a cell, energy density of the cell can be improved. Not only cell capacity is increased by removing an unnecessary space of a folding portion, but also energy density of a module/pack including such a pouch type secondary battery is increased.

Also, by removing the unnecessary space of a folding portion, a cooling structure of the module/pack and an assembly process can be simplified. Furthermore, since there is no protruding portion protruding from a bottom surface (a surface corresponding to the side surface of the electrode assembly inserted into the inserting portion) of the pouch type secondary battery even after sealing, the bottom surface can be adhered to a cooling member, and thus cooling performance of the module/pack of an edge cooling type can be improved.

Also, since the pouch type secondary battery according to the present disclosure does not include a protruding portion having a bur shape, module assembly is not hindered and assembly process efficiency is not deteriorated.

The pouch exterior material according to the present disclosure can be prevented from breaking during a manufacturing process to reduce a defective rate, can mount the electrode assembly at a proper position without having to use a separate device, and can minimize a sealing portion contacting the atmosphere to further reduce inflow of air, moisture, or the like and leakage of an electrolyte solution, thereby improving a life characteristic of a battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 5:
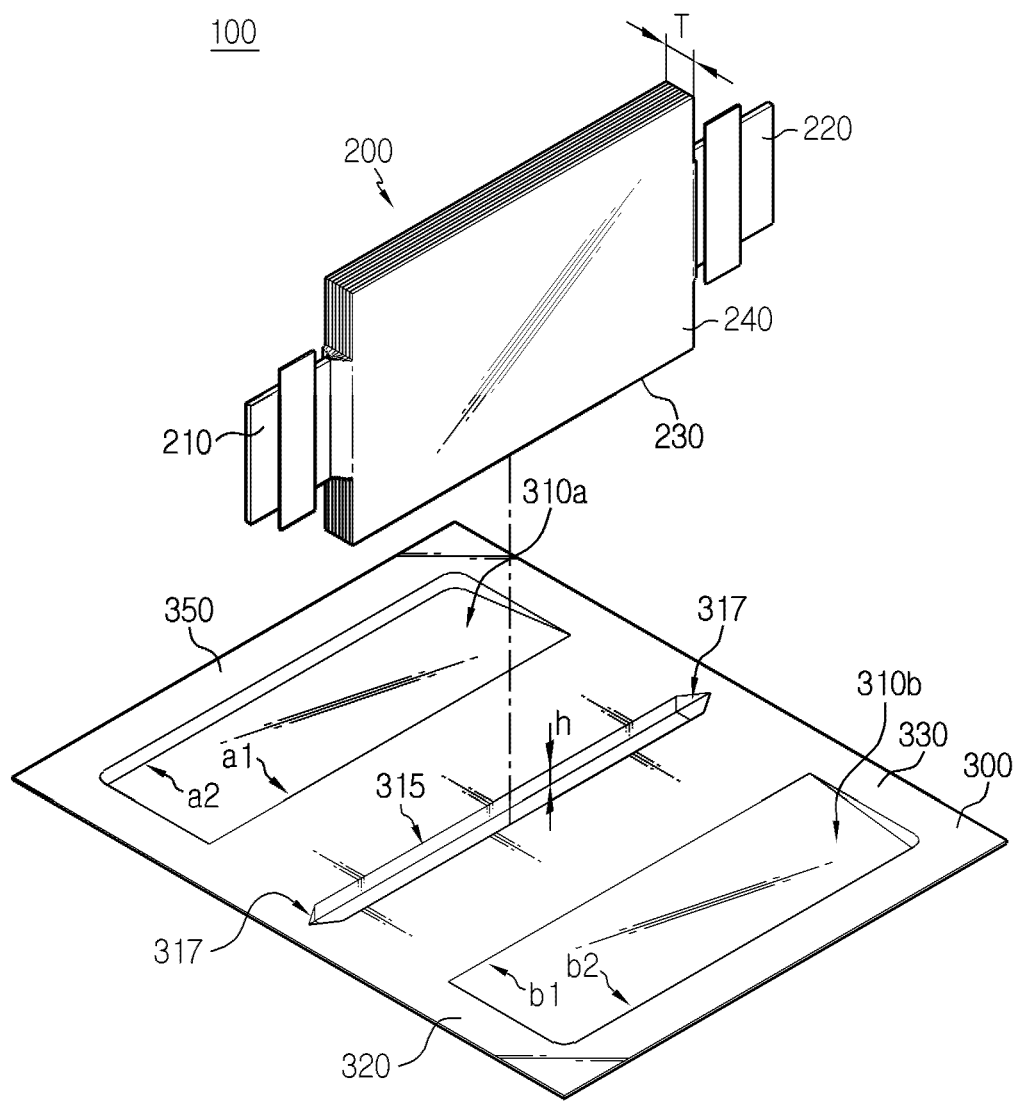
FIG. 5 is an exploded perspective view of a pouch type secondary battery according to an embodiment of the present disclosure.
Figure 6:
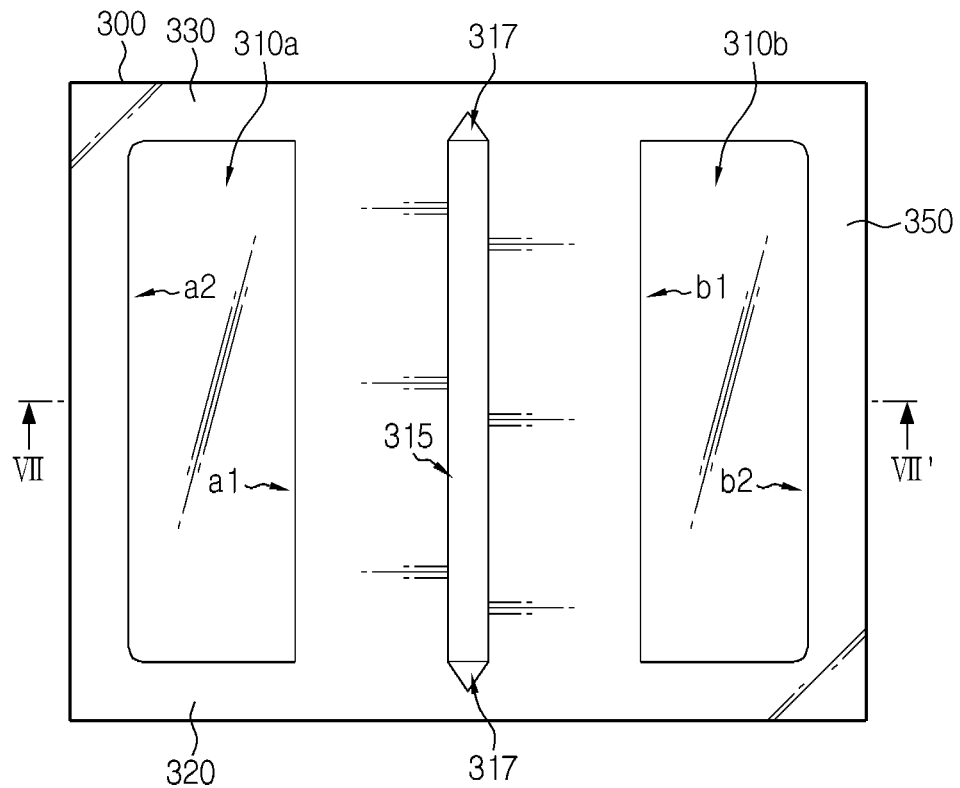
FIG. 6 is a top view of a pouch exterior material of FIG. 5.
Figure 7:
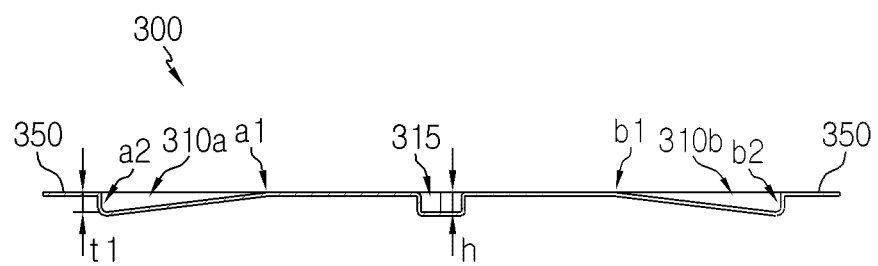
FIG. 7 corresponds to a portion of a cross-section taken along a line VII-VII' of FIG. 6.

FIG. 5 is an exploded perspective view of a pouch type secondary battery 100 according to an embodiment of the present disclosure. FIG. 6 is a top view of a pouch exterior material 300 of FIG. 5. FIG. 7 corresponds to a portion of a cross-section taken along a line VII-VII' of FIG. 6.

First, referring to FIG. 5, the pouch type secondary battery 100 includes an electrode assembly 200 and the pouch exterior material 300.

The electrode assembly 200 may be a stack type electrode assembly in which a plurality of positive electrode plates and a plurality of negative electrode plates, which are cut in units of certain size, are sequentially stacked with a separator therebetween. A positive electrode lead 210 and a negative electrode lead 220 of the electrode assembly 200 face each other and protrude from two sides of the pouch exterior material 300.

Two corresponding accommodating portions 310a and 310b are formed in the pouch exterior material 300 according to the present disclosure. Also, an inserting portion 315 is provided between the accommodating portions 310a and 310b, and the accommodating portions 310a and 310b do not communicate with each other. The accommodating portions 310a and 310b are symmetrically formed at both sides of the inserting portion 315. The accommodating portions 310a and 310b are gradually deepened from portions a1 and b1 corresponding to a width center of the electrode assembly 200 towards bottom corners a2 and b2 corresponding to an edge of the electrode assembly 200. The pouch exterior material 300 between the inserting portion 315 and each of the accommodating portions 310a and 310b is a flat section.

Compared to a related art in which a separation distance is set between accommodating portions, the separation distance being an interval greater than a thickness of an electrode assembly in addition to a margin of about 1.5 mm to 3 mm, the inserting portion 315 has a width equal to a thickness T of the electrode assembly 200. Compared to the related art, a distance between the two accommodating portions 310a and 310b is increased. Compared to the related art in which the accommodating portions are adjacently provided, mechanical strength of a certain region is not weakened or the certain region is not broken with respect to forming the pouch exterior material 300 to form the inserting portion 315 and the accommodating portions 310a and 310b.

The accommodating portions 310a and 310b are provided at both sides of the inserting portion 315, and a triangular stepped portion 317 having a depth gradually decreasing towards the end thereof is provided at opposite ends of the inserting portion 315, the opposite ends being orthogonal to a direction of both sides. When a length of the triangular stepped portion 317 is decreased, a slope of a bottom of the triangular stepped portion 317 is relatively steep. When the length of the triangular stepped portion 317 is increased, the slope of the bottom of the triangular stepped portion 317 is relatively gentle. Also, when a depth h of the inserting portion 315 is high, the slope of the bottom of the triangular stepped portion 317 is relatively steep. When the depth h of the inserting portion 315 is low, the slope of the bottom of the triangular stepped portion 317 is relatively gentle. The depth h of the inserting portion 315 and a shape of the triangular stepped portion 317 determine a final outer shape of a sealing portion during thermal fusion while the pouch type secondary battery 100 is manufactured.

Here, reference numerals 320, 330, and 350 respectively denote an upper sealing portion, a lower sealing portion, and a side sealing portion.

According to an embodiment, the pouch exterior material 300 may have a structure in which outer sides of the accommodating portions 310a and 310b facing the inserting portion 315, i.e., the side sealing portions 350, are elongated. In this case, the pouch type secondary battery 100 may be manufactured by overlapping the accommodating portions 310a and 310b to accommodate the electrode assembly 200, sealing the remaining sealing portions (contacting regions) excluding the side sealing portion 350 that is elongated, i.e., the upper sealing portion 320 and the lower sealing portion 330, injecting an electrolyte solution through the side sealing portion 350 and then sealing the side sealing portion 350, and cutting the side sealing portion 350 to a certain size. According to such a structure of the pouch exterior material 300, not only the electrolyte solution is easily injected, but also the electrolyte solution is prevented from overflowing due a mistake of an operator during an injecting process.

The pouch exterior material 300 may be formed of a laminate sheet including a metal layer and a resin layer. In particular, the laminate sheet may be an aluminum laminate sheet. The pouch exterior material 300 may include a core portion whose material includes a metal layer, a thermal fusion layer provided on an upper surface of the core portion, and an insulating layer provided on a lower surface of the core portion. The thermal fusion layer may act as an adhesion layer by using modified propylene that is polymer resin, for example, casted polypropylene (CPP), and the insulating layer may include a resin material such as nylon or polyethylene terephthalate (PET), but structures and materials of the pouch exterior material 300 is not limited thereto.

The pouch exterior material 300 may be one unit of sheet, and the accommodating portions 310a and 310b may be simultaneously formed via one process through compression molding of the aluminum laminate sheet by using a deep-drawing method using a die and a punch. The inserting portion 315 and the triangular stepped portion 317 may also be simultaneously formed via one process. The accommodating portions 310a and 310b, the inserting portion 315, and the triangular stepped portion 317 may also be simultaneously formed via one process.

Figure 8:
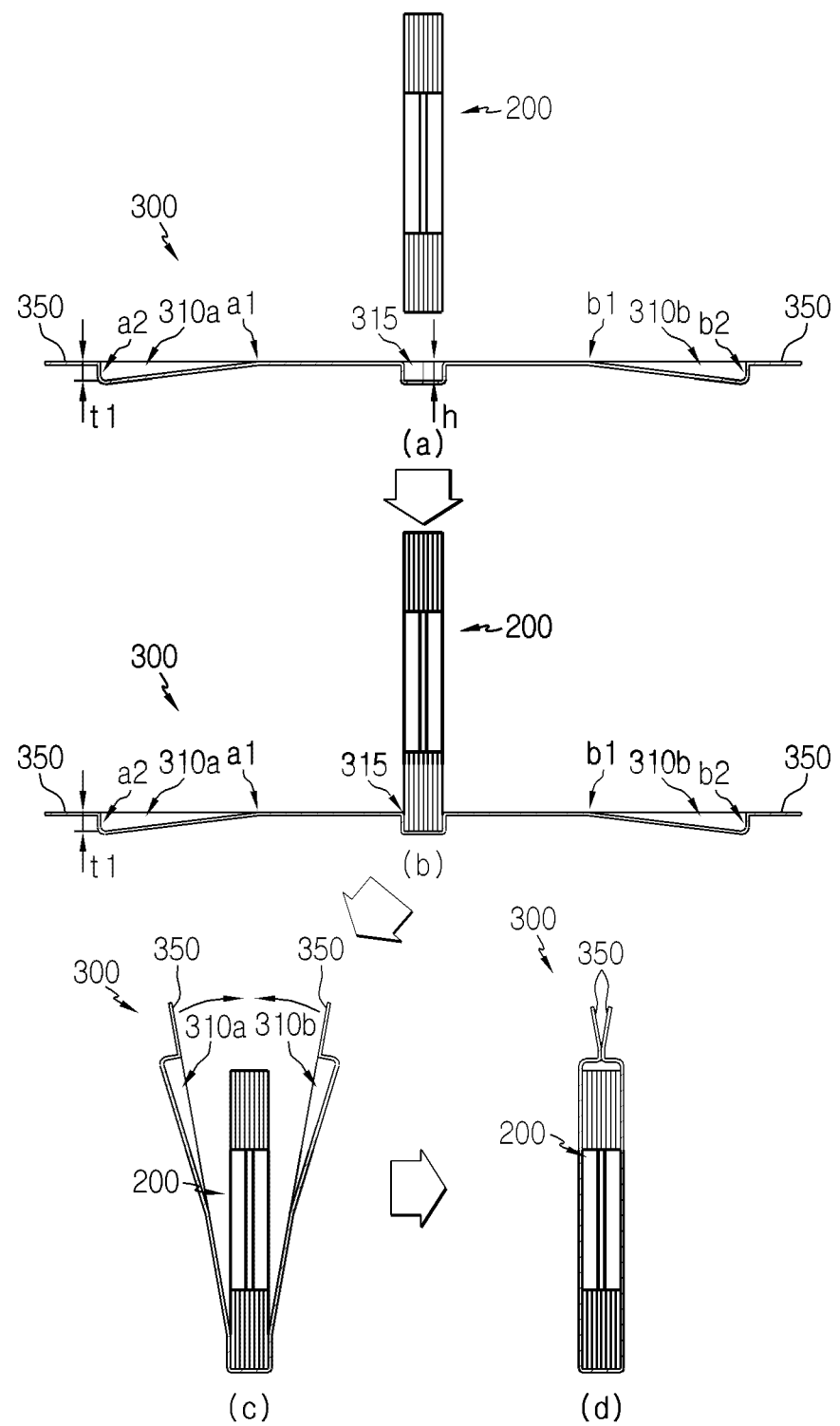
FIG. 8 is cross-sectional views of operations of a method of manufacturing a pouch type secondary battery using the pouch exterior material of FIG. 6, which are taken along a line VII-VII' of FIG. 6.

Further referring to FIG. 6 through (d) of FIG. 8, a depth t1 of the bottom corner a2 of the accommodating portion 310a far from the inserting portion 315 is equal to or greater than ½ of the thickness T of the electrode assembly 200, and similarly, the depth t1 of a bottom corner b2 of the accommodating portion 310b far from the inserting portion 315 is also equal to or greater than ½ of the thickness T of the electrode assembly 200. It is ideal that the depth t1 of bottom corners a2 and b2 is ½ of the thickness T of the electrode assembly 200 without any remaining portion, but the depth t1 may be higher as a margin for convenience of processes based on a product. Thus, the depth t1 of the bottom corners a2 and b2 is set to be equal to or greater than ½ of the thickness T of the electrode assembly 200.

In particular, as shown in FIG. 7, a bottom surface of each of the accommodating portions 310a and 310b is inclined. The accommodating portions 310a and 310b are gradually deepened from the portions a1 and b1 corresponding to the width center of the electrode assembly 200 towards the bottom corners a2 and b2 corresponding to the edge of the electrode assembly 200.

The portions a1 and b1 corresponding to the width center of the electrode assembly 200 is flexible based on the depth h of the inserting portion 315. When the depth h of the inserting portion 315 is increased, the portions a1 and b1 corresponding to the width center of the electrode assembly 200 approach the inserting portion 315. On the other hand, when the depth h of the inserting portion 315 is decreased, the portions a1 and b1 corresponding to the width center of the electrode assembly 200 recede away from the inserting portion 315. The depth h of the inserting portion 315 may be determined considering a material, elongation, etc. of the pouch exterior material 300, and as described above, the depth h of the inserting portion 315 also affects a shape of the triangular stepped portion 317, thereby determining a final outer shape of a sealing portion, and thus the depth h of the inserting portion 315 is a factor that needs to be considered carefully.

Figure 1:
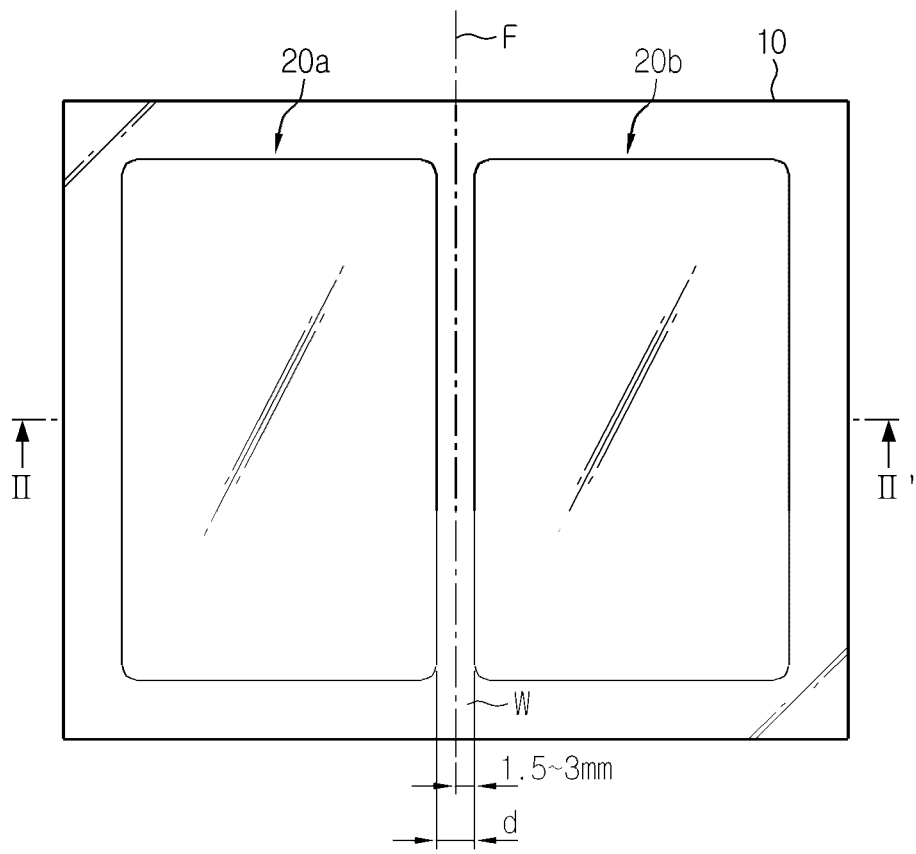
FIG. 1 is a top view of a pouch exterior material of a general 3-side sealing pouch type secondary battery.
Figure 2:
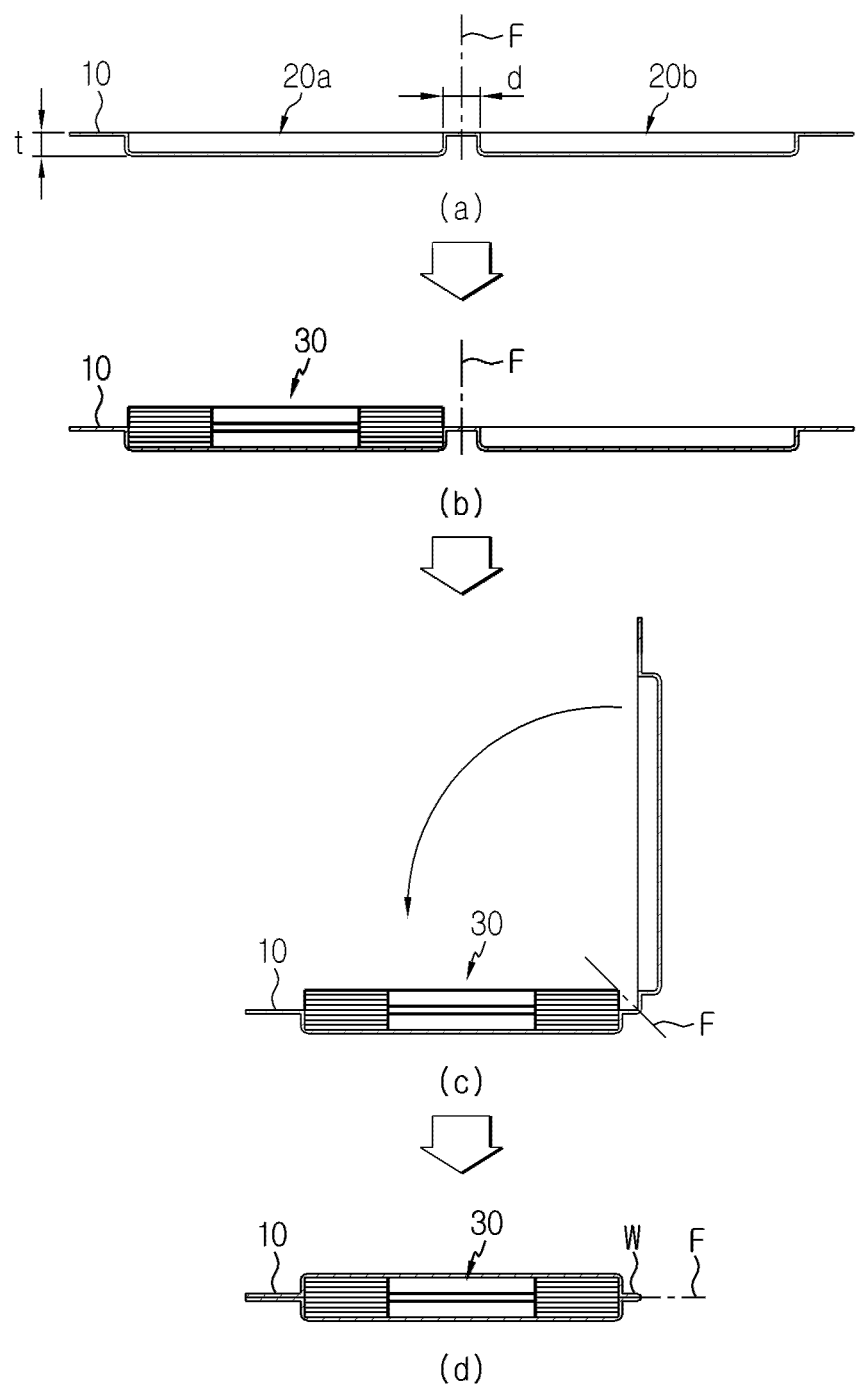
FIG. 2 is cross-sectional views of operations of a method of manufacturing a pouch type secondary battery using the pouch exterior material of FIG. 1, which are taken along a line II-II' of FIG. 1.
Figure 3:
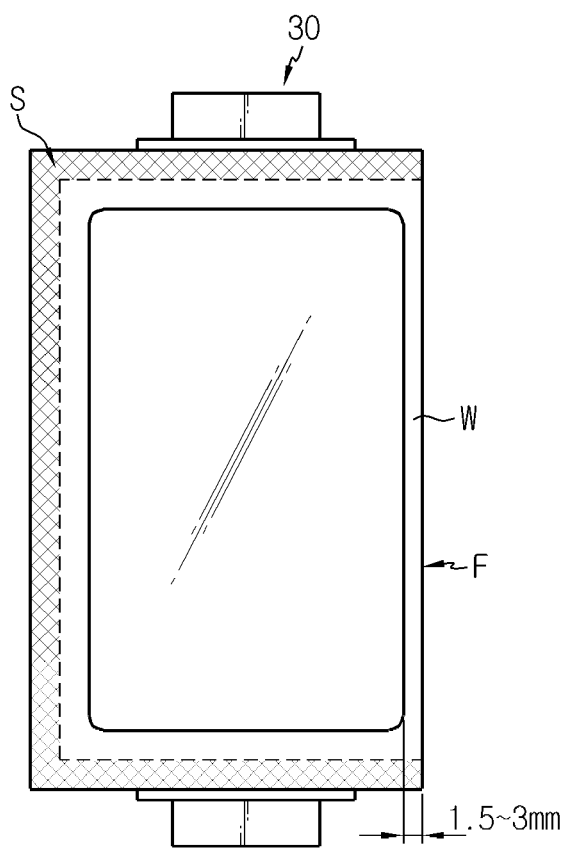
FIG. 3 is a top view of a pouch type secondary battery manufactured via the method of FIG. 2.
Figure 4:
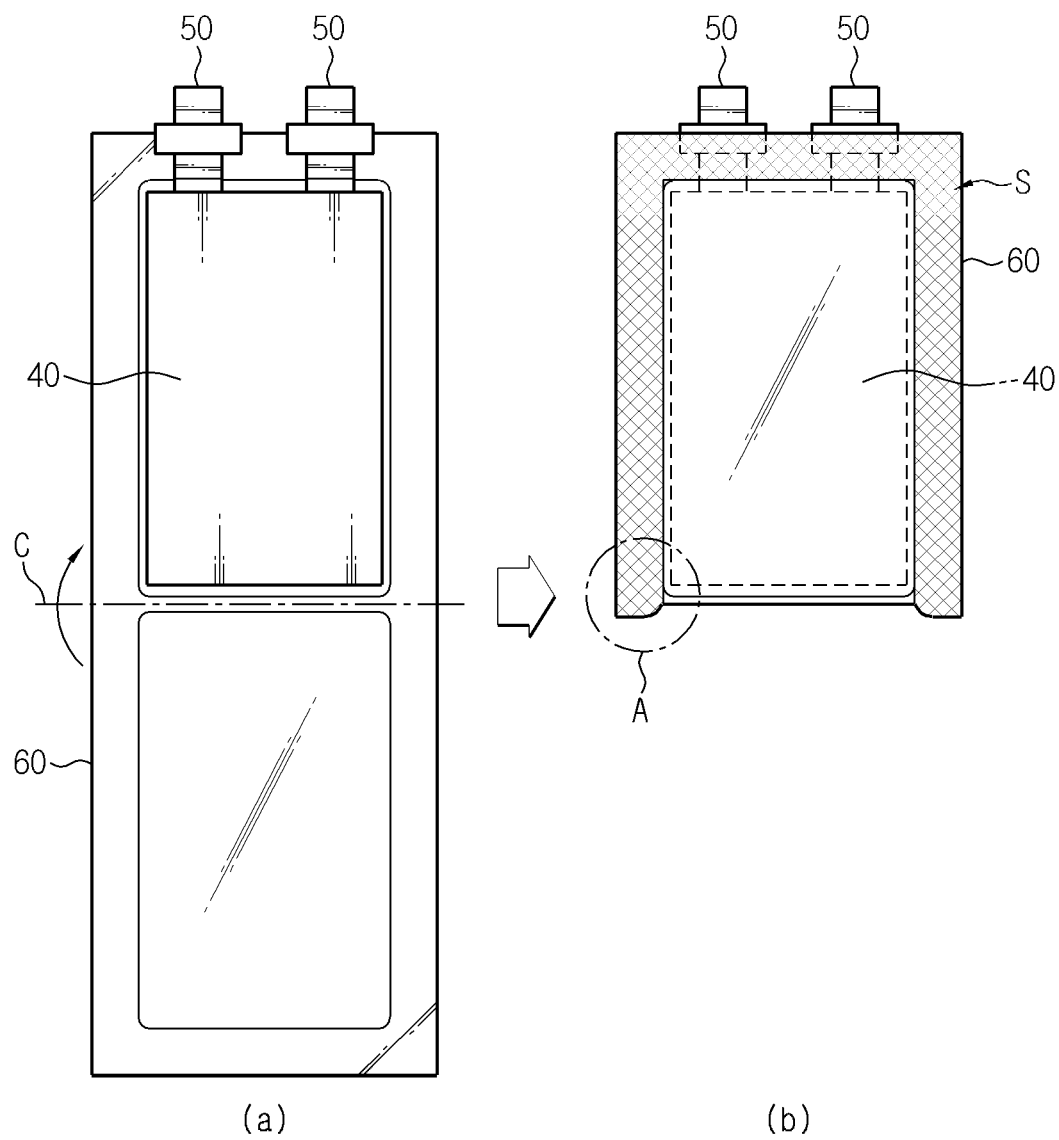
FIG. 4 is schematic views of an example of manufacturing another general pouch type secondary battery in an order of processes.

In the related art described with reference to FIGS. 1 through 3, depths of existing accommodating portions correspond to about half of a thickness of an electrode assembly and thus are even, and a bottom surface of the accommodating portion is not inclined. On the other hand, the maximum depth of the accommodating portions 310a and 310b of the pouch exterior material 300 of the present disclosure is the depth t1, which is equal to or greater than ½ of the thickness T of the electrode assembly 200, and the minimum depth thereof is 0, and thus the bottom surface is inclined with a gradual slope from one corner having the maximum depth (a portion corresponding to the edge of the electrode assembly) to the opposite side having the minimum depth (a portion corresponding to the width center of the electrode assembly 200).

As such, the pouch exterior material 300 of the present disclosure is very different from the existing pouch exterior material in a molded depth of accommodating portions, a shape of bottom surface of the accommodating portions, existence of an inserting portion between the accommodating portions, a triangular stepped portion at two ends of the inserting portion, etc.

Figure 9:
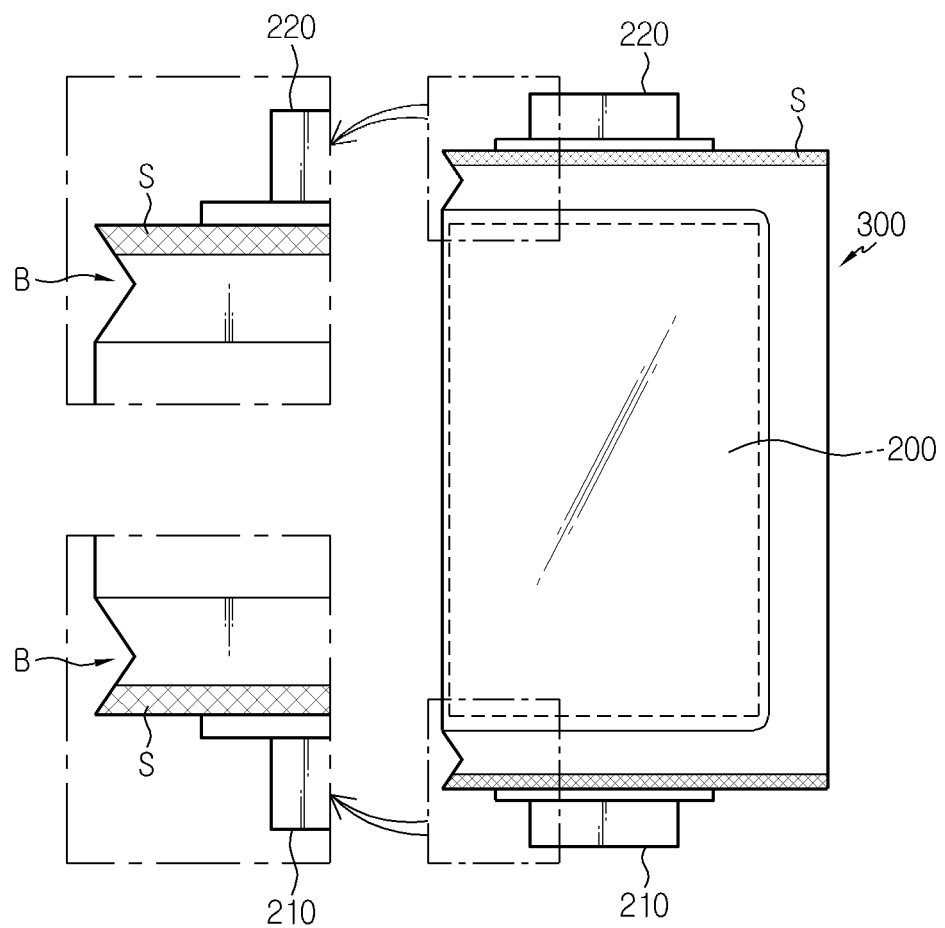
FIG. 9 is a top view of a pouch type secondary battery manufactured via the method of FIG. 8.

FIG. 8 is cross-sectional views of operations of a method of manufacturing a pouch type secondary battery using the pouch exterior material 300 of FIG. 6, which are taken along a line VII-VII' of FIG. 6. FIG. 9 is a top view of a pouch type secondary battery manufactured via the method of FIG. 8.

(a) of FIG. 8 is a cross-sectional view of the pouch exterior material 300 being unfolded after being formed, and the electrode assembly 200 is moved above the inserting portion 315 to be mounted. Then, while a side surface 230 of FIG. 5 of the electrode assembly 200 is inserted upright into the inserting portion 315 at the center of the pouch exterior material 300 as shown in (b) of FIG. 8, the pouch exterior material 300 at the accommodating portions 310a and 310b at the two sides is folded up in an order shown in (c) and (d) of FIG. 8 so as to overlap and stack the accommodating portions 310a and 310b on two surfaces of the electrode assembly 200, i.e., on a wide surface 240 of FIG. 5 determining the width of the electrode assembly 200.

Referring to FIG. 8 with FIG. 5, the side surface 230 of the electrode assembly 200 is mounted on the inserting portion 315 such that the positive electrode lead 210 and the negative electrode lead 220 respectively correspond to the upper sealing portion 320 and the lower sealing portion 330, and the pouch exterior material 300 is bent such that the upper sealing portion 320, the lower sealing portion 330, and the side sealing portion 350 contact each other.

Here, since the pouch exterior material 300 is folded up from two sides while the electrode assembly 200 is fitted and inserted to the inserting portion 315 instead of bending a flat center portion between the accommodating portions 310a and 310b as in the related art, the side surface 230 of the electrode assembly 200 may be surrounded without any unnecessary space, and since a bending angle is not greater than that of the related art, an unreasonable bending force is not applied.

In addition, since sections between the inserting portion 315 and the accommodating portions 310a and 310b are set to be flat and the accommodating portions 310a and 310b are set to be gradually deepened from the portions a1 and b1 corresponding to the width center of the electrode assembly 200 to the bottom corners a2 and b2 corresponding to the edge of the electrode assembly 200, the wide surface 240 of the electrode assembly 200 may be fittingly surrounded and even a corner portion of another side surface facing the side surface 230 of the electrode assembly 200 may be surrounded.

The pouch exterior material 300 according to the present disclosure is flexible and thus may be easily folded up, does not include a bent portion that requires a large force and thus does not have a wrinkle or the like, and may be tightly sealed in during sequent processes. As such, in the related art, a bent portion that is a center portion between two accommodating portions and is bent based one bending line is provided as a margin portion at a side center portion of an electrode assembly, but in the present disclosure, there is no unnecessary margin at the side surface 230 of the electrode assembly 200 inserted into the inserting portion 315 since the inserting portion 315 is provided at the center portion. Also, via slope structures of the bottom surfaces of the accommodating portions 310a and 310b, a side surface opposite to the side surface 230 of the electrode assembly 200 inserted into the inserting portion 315 may also be fittingly accommodated.

As such, in the present disclosure, since a corner of a side surface of an electrode assembly is completely surrounded by changing a forming shape of a pouch exterior material, the corner may be stably sealed without any unnecessary space, and a region of the electrode assembly in the pouch exterior material may be maximized. Accordingly, a pouch type secondary battery that may be used as a large-capacity secondary battery or a high capacity and high density battery for an electric vehicle, and a method of manufacturing the pouch type secondary battery may be provided.

After the process of (d) of FIG. 8 in which the pouch exterior material 300 is bent and overlapped such that the upper sealing portion 320, the lower sealing portion 330, and the side sealing portion 350 of FIG. 5 contact each other, the upper sealing portion 320 and the lower sealing portion 330 are thermally fused, an electrolyte solution is injected through a gap of the side sealing portion 350, the side sealing portion 350 is thermally fused, and then the side sealing portion 350 is cut to a certain length.

In particular, in the present disclosure, since the triangular stepped portion 317 having a depth gradually decreasing towards ends is formed at two ends of the inserting portion 315, a protruding portion is not formed at the side surface 230 of the electrode assembly 200 after the upper, lower, and side sealing portions 320, 330, and 350 are thermally fused.

Referring to FIG. 9, the sealing after the thermal fusion of the upper and lower sealing portions 320 and 330 is indicated by the reference numeral S, and unlike the related art, a dented portion as indicated by a reference numeral B rather formed instead of a protruding portion that is generated when a pouch exterior material is pressed from top and bottom portions from which electrode leads are respectively extracted. The dented portion B is formed by the triangular stepped portion 317 formed in the pouch exterior material 300. As described above, since the shape of the triangular stepped portion 317 determines the final outer shape of the sealing portion, the shape of the triangular stepped portion 317 affects a shape and dented degree of the dented portion B. Also, the shape of the triangular stepped portion 317 is affected by the length of the triangular stepped portion 317 and the depth h of the inserting portion 315, and thus the shape of the dented portion B may be determined by adjusting such factors.

As such, when the electrode assembly 200 is inserted after forming the inserting portion 315 having a shape of the side surface 230 in a thickness direction of the electrode assembly 200 in the pouch exterior material 300, the surface where the side surface 230 of the electrode assembly 200 is provided (a bottom surface of the pouch type secondary battery) may be manufactured to be flat. Also, by forming the triangular stepped portion 317 at two end of the inserting portion 315, a protruding portion that is generated during sealing as in the related art does not protrude compared to the bottom surface of the pouch type secondary battery.

As such, according to the present disclosure, an unnecessary space, such as a folding portion of a pouch exterior material during 3-side sealing, a protruding portion during sealing, or the like, is removed, thereby increasing capacity of an electrode assembly included in a pouch type secondary battery. Since a protruding portion having a bur shape is not formed in the pouch type secondary battery manufactured by using the pouch exterior material according to the present disclosure, a dead space resulting from the protruding portion is not formed, and energy density of a module/pack including such a pouch type secondary battery may be remarkably increased. Also, module assembly is facilitated by removing the protruding portion. Since interference or the like between peripheral components, which may be caused by the protruding portion of the related art, is not occurred, assembly process efficiency of the module/pack including the pouch type secondary battery according to the present disclosure may also be remarkably increased. In addition, a flat bottom surface in the pouch type secondary battery according to the present disclosure is advantageous in edge cooling type cooling.

Meanwhile, the pouch type secondary battery 100 has been described mainly based on the electrode assembly 200 in which the positive electrode lead 210 and the negative electrode lead 220 protrude in opposite directions, but an electrode assembly in which a positive electrode lead and a negative electrode lead protrude in the same direction may be manufactured into a pouch type secondary battery by using a pouch exterior material according to the present disclosure.

Figure 10:
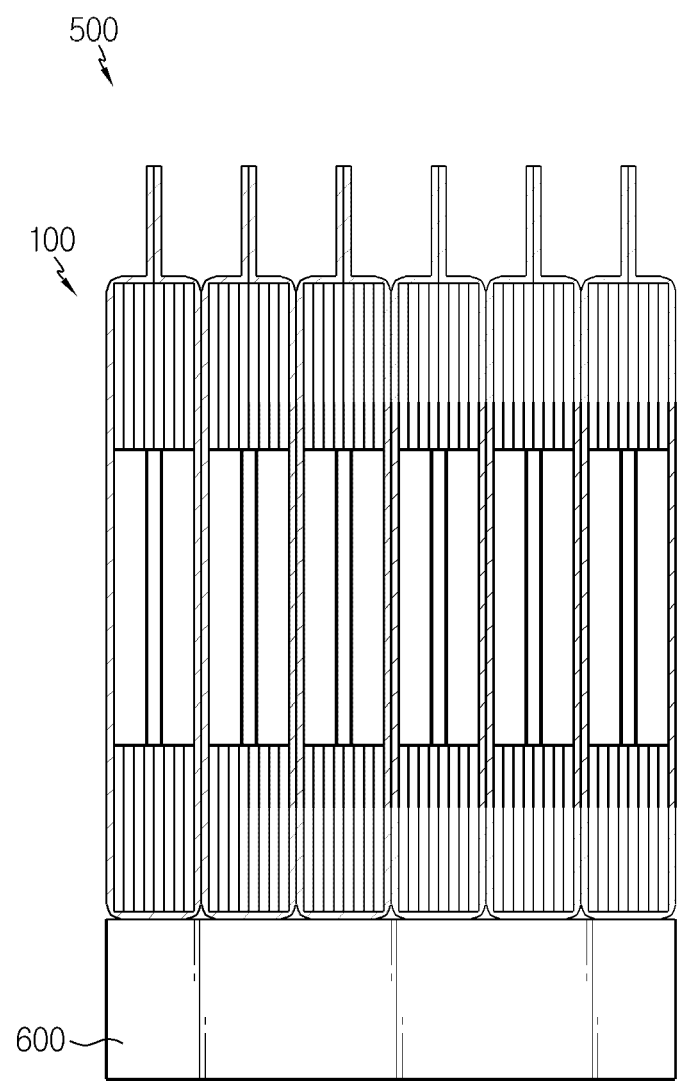
FIG. 10 is a cross-sectional view of a configuration of a battery module including a pouch type secondary battery according to the present disclosure.

A plurality of the pouch type secondary batteries 100 of FIG. 9 may be stacked on each other to be manufactured as a module/pack. FIG. 10 is a cross-sectional view of a configuration of a battery module 500 including the pouch type secondary battery 100 according to the present disclosure.

Referring to FIG. 10, in the battery module 500, the plurality of pouch type secondary batteries 100 may be gathered and attached to an upper surface of a cooling plate 600 while one un-sealed surface is positioned at the bottom. For example, a surface of the pouch type secondary battery 100 of FIG. 9 corresponding to a left side surface may be positioned at the bottom, and such a surface may be mounted on and contact the upper surface of the cooling plate 600.

Since the un-sealed surface does not include an unnecessary protruding portion compared to a sealed surface, the pouch type secondary battery 100 may be completely adhered to the cooling plate 600, and a top surface structure of the cooling plate 600 may be simplified. An electrode assembly in the pouch type secondary battery 100 and the cooling plate 600 may be very closely positioned. In other words, since the un-sealed surface does not include an unnecessary protruding portion, the cooling plate 600 and the pouch type secondary battery 100 may be completely adhered to each other. Thus, the overall volume of the battery module 500 is reduced, thereby increasing energy density. Furthermore, according to such a configuration of the present disclosure, a contact area between the pouch type secondary battery 100 and the cooling plate 600 is secured as much as possible, and thus heat transmission may be increased. Accordingly, heat generated in the electrode assembly in the pouch type secondary battery 100 may be quickly and smoothly transferred to the cooling plate 600, and thus cooling efficiency may be increased.

Hereinafter, examples of the present disclosure and the related art are compared.

Figure 11:
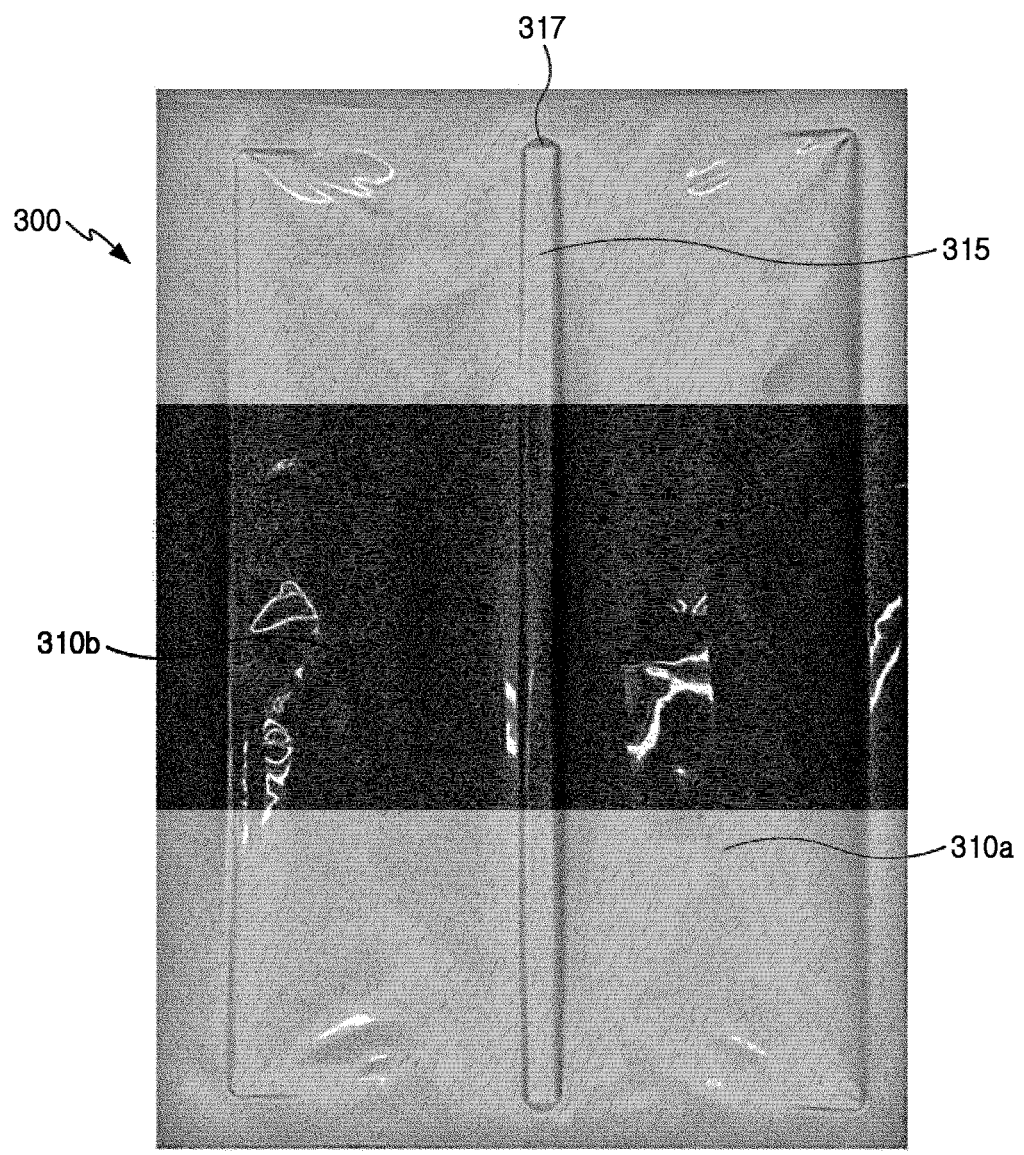
FIG. 11 is a photograph of a pouch exterior material manufactured according to an experiment example of the present disclosure.

FIG. 11 is a photograph of a pouch exterior material manufactured according to an experiment example of the present disclosure. The pouch exterior material 300 is turned over such that the accommodating portions 310a and 310b are at the bottom, and thus a bottom surface of the pouch exterior material 300 is photographed. Referring to FIG. 11, the pouch exterior material 300 was formed by forming the inserting portion 315 having a width equal to a thickness of an electrode assembly at a center of one unit of sheet type pouch exterior material, and symmetrically forming the accommodating portions 310a and 310b that are gradually deepened from portions corresponding to a width center of the electrode assembly to portions corresponding to an edge of the electrode assembly on two sides of the inserting portion 315. Also, the triangular stepped portion 317 whose depth gradually decreases towards an end was formed at two ends of the inserting portion 315. As shown in FIG. 11, the pouch exterior material 300 according to the present disclosure is formed without brakeage or tear during manufacturing processes. The accommodating portions 310a and 310b, the inserting portion 315, and the triangular stepped portion 317 are formed as desired without any distortion or stress concentration.

Figure 12:
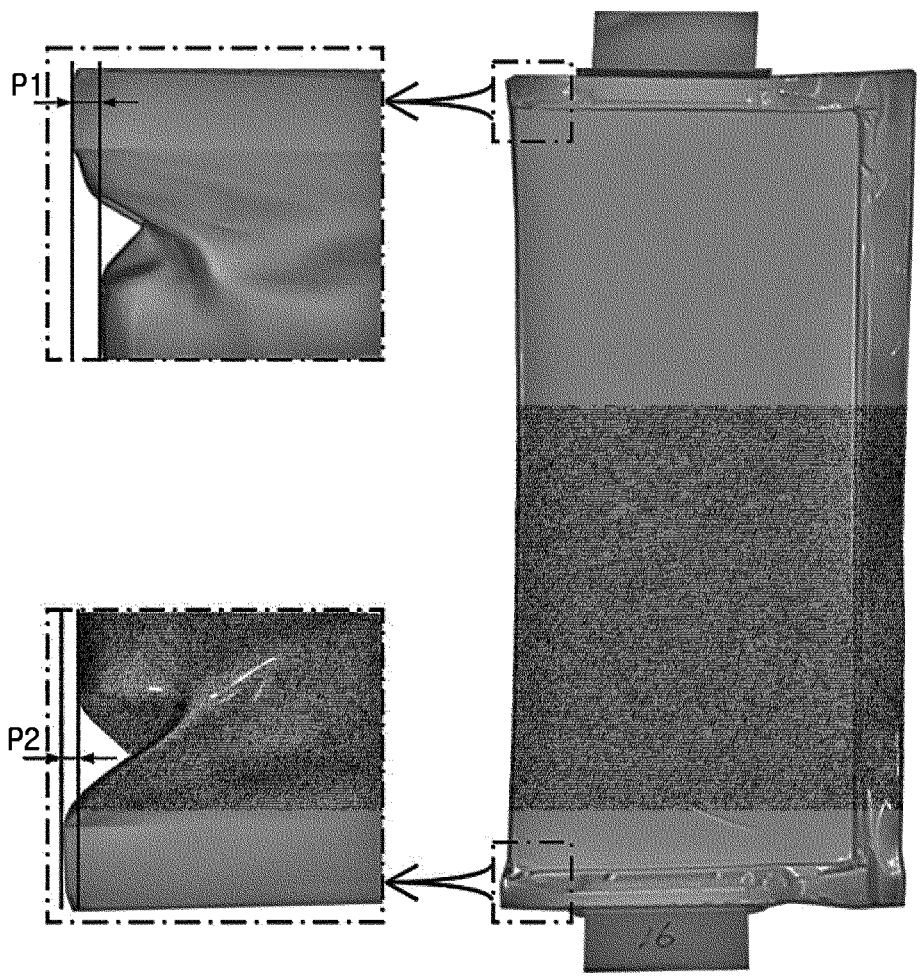
FIG. 12 is a photograph of a pouch type secondary battery manufactured by using the pouch exterior material of FIG. 11.
Figure 13:
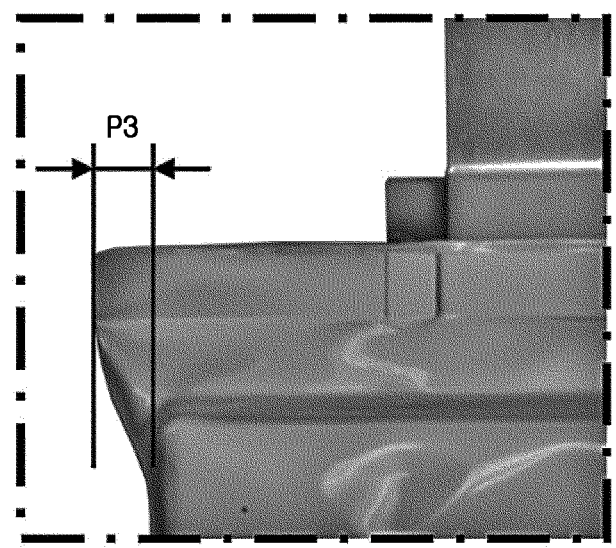
FIG. 13 is a photograph of a sealing portion of a general pouch type secondary battery.

FIG. 12 is a photograph of a pouch type secondary battery manufactured by using the pouch exterior material 300 of FIG. 11. In the current experiment example, it is determined that upper and lower sealing portions slightly protrude respectively by about distances P1 and P2 compared to a side surface corresponding to the inserting portion 315 of the pouch exterior material 300 of FIG. 11, but the distances P1 and p2 are insignificant compared with a distance P3 of FIG. 13 that is a protruding degree of the related art. Also, as described above, the distances P1 and P2 may be removed by adjusting a depth of the inserting portion 315 of the pouch exterior material 300. By adjusting the depth of the inserting portion 315 to be increased than the distances P1 and P2, protruding portions may be removed. However, when the depth of the inserting portion 315 is increased, the widths of the accommodating portions 310a and 310b, i.e., the length from the portion a1 corresponding to the width center of the electrode assembly 200 to the bottom corner a2 corresponding to the edge of the electrode assembly 200 and the length from the portion b1 corresponding to the width center of the electrode assembly 200 to the bottom corner b2 corresponding to the edge of the electrode assembly 200, need to be reduced.

Figure 14:
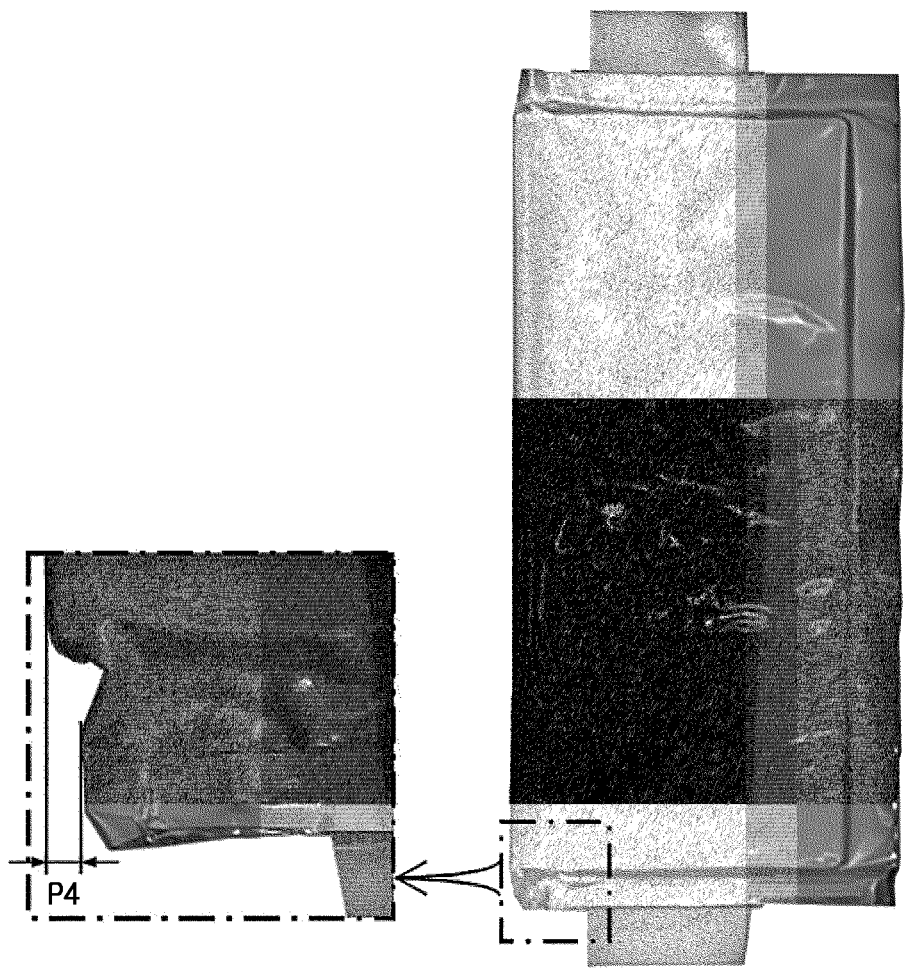
FIG. 14 is a photograph of a pouch type secondary battery manufactured by using a pouch exterior material according to another experiment example of the present disclosure.

FIG. 14 is a photograph of a pouch type secondary battery manufactured by using a pouch exterior material according to another experiment example of the present disclosure.

After checking a result of FIG. 12, another pouch exterior material was manufactured by adjusting the depth of the inserting portion 315 to be increased by the distances P1 and P2 and a pouch type secondary battery was manufactured by using the pouch exterior material, thereby removing protruding portions compared to FIG. 12. Rather, a lower sealing portion was provided further inward by a certain distance P4 compared to the side surface corresponding to the inserting portion 315 of the pouch exterior material 300. As such, according to the present disclosure, an unnecessary space is removed from a surface where the side surface 230 of the electrode assembly 200 is provided (a bottom surface of the pouch type secondary battery), i.e., an un-sealed surface, thereby increasing cell capacity. Furthermore, energy density of a module/pack including such a pouch type secondary battery may be increased. Also, by removing the unnecessary space, a cooling structure and assembly processes of the module/pack may be simplified.

Figure 15:
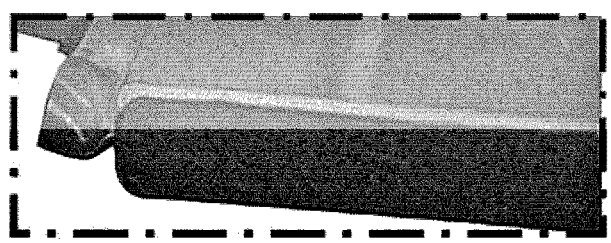
FIG. 15 is a photograph of a bottom surface of the pouch type secondary battery of FIG. 12.
Figure 16:
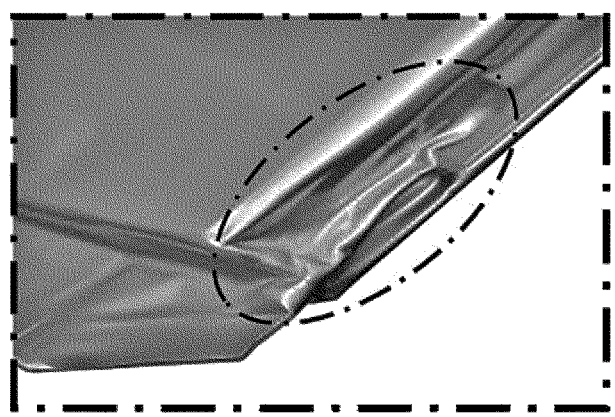
FIG. 16 is a photograph of a bottom surface of a pouch type secondary battery according to a related art.

FIG. 15 is a photograph of a bottom surface of a pouch type secondary battery according to the experiment example of the present disclosure (a surface corresponding to the side surface 230 of the electrode assembly 200 inserted into the inserting portion 315 of the pouch exterior material 300), and FIG. 16 is a photograph of a bottom surface of a pouch type secondary battery according to the related art. Comparing FIGS. 15 and 16, the pouch type secondary battery of the present disclosure has a flat bottom surface, and thus adhesion in a module using an edge cooling method is increased, and accordingly, cooling performance is increased.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A sheet type pouch exterior material for packing an electrode assembly, the pouch exterior material comprising:
   a sheet having an upper surface and a lower surface;
   an inserting portion configured to receive a side surface of the electrode assembly, wherein the inserting portion is provided at a center of the pouch exterior material and having a width in a first direction; and
   accommodating portions respectively provided at opposite sides of the inserting portion in the first direction, each of the accommodating portions being spaced from the inserting portion,
   wherein, when the sheet is unfolded:
   the inserting portion and the accommodating portions are formed to be recessed from the upper surface of the sheet,
   each of the accommodating portions includes a first edge and a second edge parallel to the inserting portion, a distance between the second edge and the inserting portion is greater than a distance between the first edge and the inserting portion, and
   a depth of each of the accommodating portions gradually increases from the first edge to the second edge.

2. The sheet type pouch exterior material of claim 1, wherein the inserting portion has a pair of side edges and a pair of end edges, a first sidewall and a second sidewall extending downwardly from the upper surface of the sheet and a bottom wall extending between the first sidewall and a second sidewall.

3. The sheet type pouch exterior material of claim 1, wherein the depth of each of the accommodating portions gradually increases from a portion corresponding to a width center of the side surface of the electrode assembly towards a portion corresponding to an edge of the electrode assembly.

4. The sheet type pouch exterior material of claim 3, wherein a depth of a bottom corner of each of the accommodating portions furthest from the inserting portion is equal to or greater than ½ of the thickness of the electrode assembly.

5. The sheet type pouch exterior material of claim 1, wherein a flat section of the pouch exterior material extends between the inserting portion and each of the accommodating portions.

6. The sheet type pouch exterior material of claim 1, wherein outer sides of each of the accommodating portions facing the inserting portion are substantially elongated.

7. The sheet type pouch exterior material of claim 1, wherein the inserting portion further comprises a triangular stepped portion at each end of the inserting portion, each triangular stepped portion having a depth gradually decreasing towards an end furthest from the inserting portion.

8. A pouch type secondary battery comprising:
   an electrode assembly; and
   a sheet type pouch exterior material packing the electrode assembly,
   wherein the pouch exterior material comprises:
   a sheet having an upper surface and a lower surface;
   an inserting portion configured to receive a side surface of the electrode assembly, wherein the inserting portion is provided at a center of the pouch exterior material and having a width in a first direction equal to a thickness of the electrode assembly; and
   accommodating portions respectively provided at opposite sides of the inserting portion in the first direction, each of the accommodating portions being spaced from the inserting portion,
   wherein, when the sheet is unfolded:
   the inserting portion and the accommodating portions are formed to be recessed from the upper surface of the sheet,
   each of the accommodating portions includes a first edge and a second edge parallel to the inserting portion, a distance between the second edge and the inserting portion is greater than a distance between the first edge and the inserting portion, and
   a depth of each of the accommodating portions gradually increases from the first edge to the second edge.

9. The pouch type secondary battery of claim 8, wherein the inserting portion has a pair of side edges and a pair of end edges, a first sidewall and a second sidewall extending downwardly from the upper surface of the sheet and a bottom wall extending between the first sidewall and a second sidewall.

10. The pouch type secondary battery of claim 8, wherein the depth each of the accommodating portions gradually increases from a portion corresponding to a width center of a side surface of the electrode assembly towards a portion corresponding to an edge of the electrode assembly.

11. The pouch type secondary battery of claim 10, wherein a depth of a bottom corner of each of the accommodating portions furthest from the inserting portion is equal to or greater than ½ of the thickness of the electrode assembly.

12. The pouch type secondary battery of claim 8, wherein a flat section of the pouch exterior material extends between the inserting portion and each of the accommodating portions.

* * * * *